US006952823B2

(12) United States Patent
Kryloff et al.

(10) Patent No.: US 6,952,823 B2
(45) Date of Patent: *Oct. 4, 2005

(54) SOFTWARE PATCH GENERATOR USING COMPRESSION TECHNIQUES

(75) Inventors: Sergey A. Kryloff, Saint Petersburg (RU); Yuri Basin, Thiensville, WI (US)

(73) Assignee: PKWare, Inc., Milwaukee, WI (US)

( * ) Notice: Subject to any disclaimer, the term of this patent is extended or adjusted under 35 U.S.C. 154(b) by 605 days.

This patent is subject to a terminal disclaimer.

(21) Appl. No.: 09/940,771

(22) Filed: Aug. 27, 2001

(65) Prior Publication Data

US 2003/0028867 A1 Feb. 6, 2003

(Under 37 CFR 1.47)

Related U.S. Application Data

(63) Continuation-in-part of application No. 09/144,666, filed on Sep. 1, 1998, now Pat. No. 6,289,509.

(51) Int. Cl.[7] .................................................. G06F 9/44
(52) U.S. Cl. ....................... 717/170; 717/106; 717/168; 707/203
(58) Field of Search .................................. 717/106, 168, 717/170; 707/203

(56) References Cited

U.S. PATENT DOCUMENTS

| 4,542,453 | A | 9/1985 | Patrick et al. |
| 4,939,639 | A | 7/1990 | Lee et al. |
| 5,155,847 | A | 10/1992 | Kirouac et al. |
| 5,218,700 | A | 6/1993 | Beechick |
| 5,270,712 | A | 12/1993 | Iyer et al. |
| 5,481,713 | A | 1/1996 | Wetmore et al. |
| 5,581,697 | A | 12/1996 | Gramlich et al. |
| 5,699,275 | A | 12/1997 | Beasley et al. |
| 5,802,549 | A | 9/1998 | Goyal et al. |
| 5,832,273 | A | 11/1998 | Mizuse |
| 5,832,520 | A | 11/1998 | Miller |

(Continued)

FOREIGN PATENT DOCUMENTS

WO    WO 99/49391 A    9/1999

OTHER PUBLICATIONS

Randal C. Burns, "Differential Compression: A Generalized Solution for Binary Files", Thesis, Dec. 1996 XP002211282, pp. 7–24.

Reichenberger C., "Delta Storage for Arbitrary Non–Text Files" 1991, New York, NY, USA, ACM, USA, 1991, pp. 144–152, XP008030925 ISBN: 0–89791–429–5.

Material on RTPatch Professional Products published at: http://www.pocketsoft.com/products.html.

User's Manual for BinPatch V1.9.

*Primary Examiner*—Tuan Dam
*Assistant Examiner*—Mary Steelman
(74) *Attorney, Agent, or Firm*—McAndrews, Held & Malloy, Ltd.

(57) ABSTRACT

A method and system for generating a patch file from an old version of data which consists of a series of elements and a new version of data which also consists of a series of elements. Several patch files may then be aggregated into a secure, portable compressed archive to decrease the storage and transfer requirements of the patch file. The compressed archive uses an encryption process and may include an authentication process using digital signatures to secure the contents of the patch file from unauthorized access and to validate the identity of the creator of the archive. The archive is preferably in the format of a self-extracting .ZIP file, which file may include a rules-based form of intelligence to detect the presence of the appropriate files to be patched and to determine how the patching process should proceed.

13 Claims, 10 Drawing Sheets

| Current Line Number in First List | Current Line Number in Second List | Relation Between Current Words ("<", ">" or "=") |
|---|---|---|
| 1 | 1 | < |
| 2 | 1 | < |
| 3 | 1 | < |
| 4 | 1 | = (ABD) |
| 5 | 2 | < |
| 6 | 2 | > |
| 6 | 3 | > |
| 6 | 4 | < |
| 7 | 4 | < |
| 8 | 4 | > |
| 8 | 5 | < |
| 9 | 5 | > |
| 9 | 6 | = (BBD) |
| 10 | 7 | = (BCA) |
| 11 | 8 | = (BDA) |
| 12 | 9 | > |
| 12 | 10 | = (CAB) |
| 13 | 11 | = (CBA) |
| 14 | 12 | < |
| 15 | 12 | < |
| 16 | 12 | > |
| 16 | 13 | > |
| 16 | 14 | > |
| 16 | 15 | = (DCB) |
| 17 | 16 | > |
| 17 | 17 | > |

U.S. PATENT DOCUMENTS

| | | |
|---|---|---|
| 5,937,188 A | 8/1999 | Freeman |
| 6,018,747 A | 1/2000 | Burns et al. |
| 6,049,671 A * | 4/2000 | Slivka et al. ............... 717/173 |
| 6,083,279 A | 7/2000 | Phipps et al. |
| 6,289,509 B1 | 9/2001 | Kryloff |
| 6,415,435 B1 * | 7/2002 | McIntyre ................... 717/108 |
| 6,466,999 B1 * | 10/2002 | Sliger et al. ................. 710/68 |
| 6,477,703 B1 * | 11/2002 | Smith et al. ................ 717/168 |
| 6,526,574 B1 * | 2/2003 | Jones ........................ 717/168 |
| 6,594,822 B1 * | 7/2003 | Schweitz et al. ........... 717/140 |

* cited by examiner

| First List (Old Version of Computer Code): | | Second List (New Version of Computer Code): | |
|---|---|---|---|
| Word | Position | Word | Position |
| ABC | 1 | DBC | 1 |
| BCA | 2 | BCA | 2 |
| CAB | 3 | CAB | 3 |
| ABD | 4 | ABD | 4 |
| BDA | 5 | BDA | 5 |
| DAB | 6 | DAD | 6 |
| ABB | 7 | ADD | 7 |
| BBA | 8 | DDB | 8 |
| BAC | 9 | DBB | 9 |
| ACD | 10 | BBB | 10 |
| CDD | 11 | BBD | 11 |
| DDC | 12 | BDC | 12 |
| DCB | 13 | DCB | 13 |
| CBA | 14 | CBA | 14 |
| BAB | 15 | BAD | 15 |
| ABB | 16 | ADC | 16 |
| BBD | 17 | DCD | 17 |

FIG. 5

|     | First Sorted List of Code: | | | Second Sorted List of Code: | |
| --- | --- | --- | --- | --- | --- |
| Line Number | Word | Offset ($P_{1st}$) | | Word | Offset ($P_{2nd}$) |
| 1 | ABB | 7 | | ABD | 4 |
| 2 | ABB | 16 | | ADC | 16 |
| 3 | ABC | 1 | | ADD | 7 |
| 4 | ABD | 4 | | BAD | 15 |
| 5 | ACD | 10 | | BBB | 10 |
| 6 | BAB | 15 | | BBD | 11 |
| 7 | BAC | 9 | | BCA | 2 |
| 8 | BBA | 8 | | BDA | 5 |
| 9 | BBD | 17 | | BDC | 12 |
| 10 | BCA | 2 | | CAB | 3 |
| 11 | BDA | 5 | | CBA | 14 |
| 12 | CAB | 3 | | DAD | 6 |
| 13 | CBA | 14 | | DBB | 9 |
| 14 | CDD | 11 | | DBC | 1 |
| 15 | DAB | 6 | | DCB | 13 |
| 16 | DCB | 13 | | DCD | 17 |
| 17 | DDC | 12 | | DDB | 8 |

55 (First Sorted List); 57 (Second Sorted List)

FIG. 6

| Current Line Number in First List | Current Line Number in Second List | Relation Between Current Words ("<", ">" or "=") |
|---|---|---|
| 1 | 1 | < |
| 2 | 1 | < |
| 3 | 1 | < |
| 4 | 1 | = (ABD) |
| 5 | 2 | < |
| 6 | 2 | > |
| 6 | 3 | > |
| 6 | 4 | < |
| 7 | 4 | < |
| 8 | 4 | > |
| 8 | 5 | < |
| 9 | 5 | > |
| 9 | 6 | = (BBD) |
| 10 | 7 | = (BCA) |
| 11 | 8 | = (BDA) |
| 12 | 9 | > |
| 12 | 10 | = (CAB) |
| 13 | 11 | = (CBA) |
| 14 | 12 | < |
| 15 | 12 | < |
| 16 | 12 | > |
| 16 | 13 | > |
| 16 | 14 | > |
| 16 | 15 | = (DCB) |
| 17 | 16 | > |
| 17 | 17 | > |

FIG. 7

| Word | ABD | BBD | BCA | BDA | CAB | CBA | DCB |
|---|---|---|---|---|---|---|---|
| Max Coincidence Block Length | * | 3 | 6 | * | * | * | 4 |
| Old File Offset | * | 17 | 2 | * | * | * | 13 |
| New File Offset | * | 11 | 2 | * | * | * | 13 |

| Max Coincidence Block Length | 3 | 6 | 4 |
|---|---|---|---|
| Old File Offset | 17 | 2 | 13 |
| New File Offset | 11 | 2 | 13 |

| Max Coincidence Block Length | 6 | 3 | 4 |
|---|---|---|---|
| Old File Offset | 2 | 17 | 13 |
| New File Offset | 2 | 11 | 13 |

| End of Block + 1 in the New File | 8 | 14 | 17 |
|---|---|---|---|

SOFTWARE PATCH GENERATOR USING COMPRESSION TECHNIQUES

CROSS-REFERENCE TO RELATED APPLICATIONS

This application is a continuation-in-part of U.S. application Ser. No. 09/144,666, filed Sep. 1, 1998 now U.S. Pat. No. 6,289,509.

BACKGROUND OF THE INVENTION

The present invention relates to a method and system for creating revisions of data files, and more particularly, to a system and method for creating patch files and aggregating them into secure, portable compressed archives for distribution. These archives are in a form that is applied to an original copy of the file to revise it (or patch it) to a newer version. The method of the invention includes the ability for combining, compressing, encrypting, authenticating and signing patch files. The present invention covers any type of data or file that may require revisions.

Software vendors are continually fixing, modifying, and enhancing the computer programs supplied to their customers. Typically, such changes are in response to bugs found in the programs, to the need for improved or more features, or a combination of both. In the past and still today, the predominant method of updating software and providing fixes is to supply customers a disc (e.g., floppy or CD-ROM) containing a complete new version of the program. Upon receipt of the upgrade disc, the customer installs the new version of the software on his or her computer. The installation process generally results in the old version of the program being overwritten with the new version. The same problems arise with fixing or modifying the contents of files or folders.

There are several problems with this method of supplying upgrades. First, it generally takes a relatively large amount of time to produce sufficient quantities of discs for distribution to customers. Accordingly, such discs are released only once or twice a year. This reduces the speed at which customers can be supplied with fixes to their programs and may force them to operate the software with errors or other bugs for several months. Second, physical discs are expensive to create and deliver.

Thus, there have been some attempts to deliver upgrades via communication networks such as the Internet or by direct connection using modems. However, even with ever improving transmission capacity and reliability, transmission of large upgrade files can be difficult and time consuming to complete. In response to the difficulties of transmitting large complete files, patch technology has been developed that permits the transmission of smaller, partial programs. In many instances, only certain parts or files need to be repaired or updated in order to update a computer program. Therefore, only a partial or "patch" file needs to be transmitted to the end user. Generally, small files may be transmitted faster and more reliably than larger files. However, existing patch technology is unacceptable when anything more than minor changes need to be delivered to a customer. Accordingly, there is a need for an improved method and system of upgrading electronic data, files or folders using patches. More specifically, there is a need for an improved system and method of generating a patch file.

In addition, most types of computer data or files are to some degree redundant, in that they contain patterns of characters that occur over and over again throughout the file. File compression programs take advantage of this fact. Instead of listing a piece of information over and over again, a file compression program lists that information once, then refers back to it wherever it appears in the original file, thus creating a representation of the original file that is smaller than the original, i.e. the compressed file. An expansion program expands a compressed file back into the original file. The present invention allows one to compress patch files into a .ZIP file and to extract patch files from a .ZIP file. The .ZIP file provides a folder, or archive, of compressed patch files and contains instructions and information needed to direct the patch files to be applied to the specific files to be patched. The files to be patched may, or may not, be contained in the same .ZIP file. The common format of this file is a self-extracting executable .ZIP file.

Compression of computer files has been around for years. Compressing files can save significant amounts of disk space or memory, and transfer time when downloading files from the Internet or transferring files through email. Most files downloaded from the Internet are compressed in some way. Many compression formats have been developed over the years. The zip format, created by the assignee of the present invention, is the most common compressed file format, but there are others in use today. Files with a ".ZIP" extension are compressed files in the zip format. Zip files are indicated by a ".ZIP" filename extension. Zipping a file means compressing the file into the zip format so that the resulting .ZIP file occupies less disk space. Unzipping a file means uncompressing a compressed file in the zip format back into its original form. A .ZIP file is a file which contains one or more computer files that have been compressed with PKZIP®, a data compression program from PKWare, Inc., or another compatible compression program.

PKZIP® is a utility program that performs data compression and archiving. The file that PKZIP® creates is called a ".ZIP" file. PKZIP® can be used to exchange data files between different platforms or machines. PKSFX® is another data compression program from PKWare, Inc. The function of PKSFX® is to turn a .ZIP file into a self-extracting file with a .EXE file extension. A PKSFX® file is an executable file that automatically extracts the files it contains when executed.

A computer file is compressed through the use of one or more compression algorithms. A compression algorithm is essentially a mathematical formula that scans the data in the file for compressible information. For example, compressible information may be any repeating pattern or string that can be represented in a shorter length than the original compressible information. The compression algorithm will then store only the repeated patterns, along with a pointer system, in a file or folder to save space. For standard compression, most of the compression algorithms work in basically this way. Some are more efficient or faster than others.

Generally, the contents of a compressed file cannot be accessed unless the archive is uncompressed. In order to uncompress a file, a user needs to either use the same program used to compress the file, or use another program that is compatible with the particular compression format. That means that users are required to use standalone programs to compress and uncompress their files. The same problem occurs when trying to work with and manipulate compressed archived files. For example, a user wanting to open an existing compressed file, modify the file, or extract data from the file and transfer it to another file would have to command a standalone program to uncompress the original file and command the standalone program to compress the modified file. This process is often burdensome and inconvenient to the user. Therefore, it would be beneficial to create a product that would eliminate the need for separate standalone compression programs, and eliminate the need to separately command a file to be uncompressed or compressed each time the file is opened, modified, or saved.

However, all of the above products are implemented differently from the present invention, and do not include many of the features of the present invention. Many of the above programs have increased performance overhead in processing (compressing/uncompressing) files continuously in and out, and it is often difficult for a user to determine if he or she is working with files contained inside or outside a .ZIP file.

Accordingly, there is a need for a system and method for easy management and manipulation of archive files, especially patch archive files.

SUMMARY OF THE INVENTION

Therefore, it is an object of the present invention to provide an improved method and system of revising electronic data files.

It is another object of the present invention to provide a file patch generator that efficiently produces patches of relatively small size.

It is yet another object of the present invention to aggregate one or more patch files into a secure, portable compressed archive (a .ZIP file) to decrease the storage and transfer requirements of the patch files. The archive is preferably in the format of a self-extracting .ZIP file.

It is a further object of the present invention to encrypt and authenticate the compressed patch files using digital signatures to secure the contents of the patch file from unauthorized access and to validate the identity of the creator of the .ZIP file.

It is yet a further object of the present invention for the archive to include a rules-based form of intelligence to detect the presence of the appropriate files to be patched and to determine how the patching process should proceed.

These and other objects are achieved in a system for generating a patch file from an old version of electronic data, which consists of a series of elements, and a new version of electronic data, which also consists of a series of elements. Both the old and new versions of electronic data are stored in a memory of a computer, such as a server, in the system. The old and new versions of electronic data are accessible by a data processor of the computer.

An alphabet for processing the old and new versions of electronic data is first programmed into the computer. The alphabet consists of words of a desired size. Thus, for example, all sequences of three elements in each of the old and new versions of electronic data may be treated as a single word.

Once the alphabet is established, the old version of electronic data is sorted with the data processor alphabetically according to the established alphabet to create a first sorted list of data. A pointer is maintained in the first sorted list of data in order to indicate each element's original location in the old version of electronic data. Similarly, the new version of electronic data is also sorted alphabetically to create a second sorted list of data with a pointer of each element to indicate the element's original location in the new version of electronic data. Once the two sorted lists are created, they are recursively compared one word at a time to search for a match of data. Upon finding a match of data, the first and second sorted lists of data are searched to find the largest sequence of coinciding elements preceding and succeeding the match of data. Each sequence of coinciding words is then stored in a coincidences list. The coincidences list is then processed to remove duplicative information. Finally, a patch file is created from the processed coincidences list.

The process of creating a patch file from the processed coincidences list includes the steps of (a) finding a largest block of coinciding elements of the processed coincidences list that matches the second sorted list of data and recording the location of the largest found segment in memory; (b) in the area before the previously found segment, finding the next largest block of coinciding elements of the processed coincidences list that matches the second sorted list of data and recording the location of the next largest segment in memory; (c) repeating step (b) until (1) the first member of the processed list of coincidences is reached, or (2) there are no matches between the second sorted list of data and the processed coincidences list; (d) writing a "write from the old version of electronic data" command and offset and length information to the patch file if the first member of the processed list of coincidences is reached; and (e) writing a "write from patch file" command and length and patch information to the patch file if there are no matches between the second sorted list of data and the processed list of coincidences.

The present invention also includes a process for combining, compressing, and signing the patch files for decreasing the storage and transfer requirements of the patch data. The invention provides the ability for compressing patch files into a self-extracting .ZIP file with digital signatures, encryption, and authentication. The present invention covers any type of data or file that may require revisions. The compressed digitally signed patch files are incorporated into self-extracting executable files that are automatically extracted and decompressed upon execution.

In another aspect of the invention, multiple patch files are combined into a portable archive used to transfer a collection of patches more efficiently using compression, authentication and encryption. The portable archive includes features to detect the presence of the files to be patched on a target system and then applies the sequence of patches automatically. In other words, the invention provides a self-extracting .ZIP file with intelligence to determine if a patch is necessary and how the patch should be implemented.

The resulting deliverable of a portable compressed patch archive holds one or more patch files in a compressed form to decrease the storage and transfer requirements of the patch data. The one or more patch files created will be aggregated into a secure, portable, compressed archive for distribution. The self-extracting .ZIP file includes a rules-based form of intelligence to detect the presence of the appropriate files to be patched and to determine how the patching process should proceed. Additional functions include digital certificate based file authentication and encryption of the patch files. The patch archive will include encryption and authentication using digital signatures to secure the contents from unauthorized access and to validate the identity of the creator of the archive.

The invention provides the ability to digitally sign archives using standard digital certificates from VeriSign, Tawes, Digital IDs or other digital certificate companies. The invention also includes an authentication and encryption function, which allows a user to digitally sign and encrypt individual patch files archived in a .ZIP file and subsequently authenticate and decrypt those files upon extraction. Upon receiving a digitally signed .ZIP file, one can detect whether the integrity of the .ZIP file has been compromised. Encrypting a file denies access by unauthorized users to the file's contents.

Various other features, objects, and advantages of the invention will be made apparent to those skilled in the art from the following detailed description of the invention taken in combination with the accompanying drawings.

BRIEF DESCRIPTION OF THE DRAWINGS

FIG. 5 is a diagram showing the old and new versions of the electronic data organized into a list of alphabetical words (each word consisting of three symbols).

FIG. 6 is a diagram showing the old and new versions of electronic data sorted alphabetically in a list of three-symbol words.

FIG. 7 is a diagram illustrating the methodology for finding coincidences in the two sorted lists of electronic data shown in FIG. 6.

FIG. 8 is a diagram of the list of coinciding words in the two sorted lists of data.

FIG. 9 is a list of coincidences where duplicative information has been removed.

FIG. 10 is a list of sorted non-duplicative coincidences.

FIG. 11 is a list of end block values,

DESCRIPTION OF THE PREFERRED EMBODIMENTS

Figure 1:
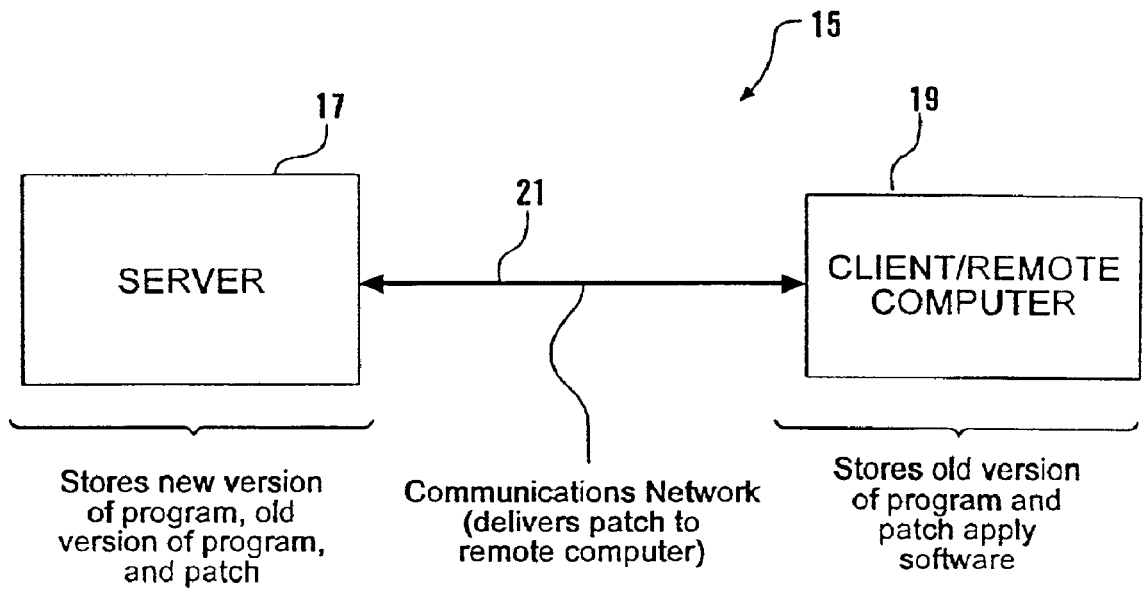
FIG. 1 is a schematic diagram of a prior art server or host computer connected to a client or remote computer via a communications network.

A conventional client-server computer system 15 is shown schematically in FIG. 1. The system 15 includes a server (or main computer) 17. The server 17 is coupled to a remote or client computer 19. The server 17 and client 19 are coupled to each other via a communications network 21, which can be any available network, from a LAN (local area network) to the Internet, it being understood that the present invention is intended to be implemented using presently existing and well-known computer hardware and communications technology. Of course, the inventor(s) envision(s) that the invention may also be implemented with equipment and technology not yet commercially available.

Figure 2:
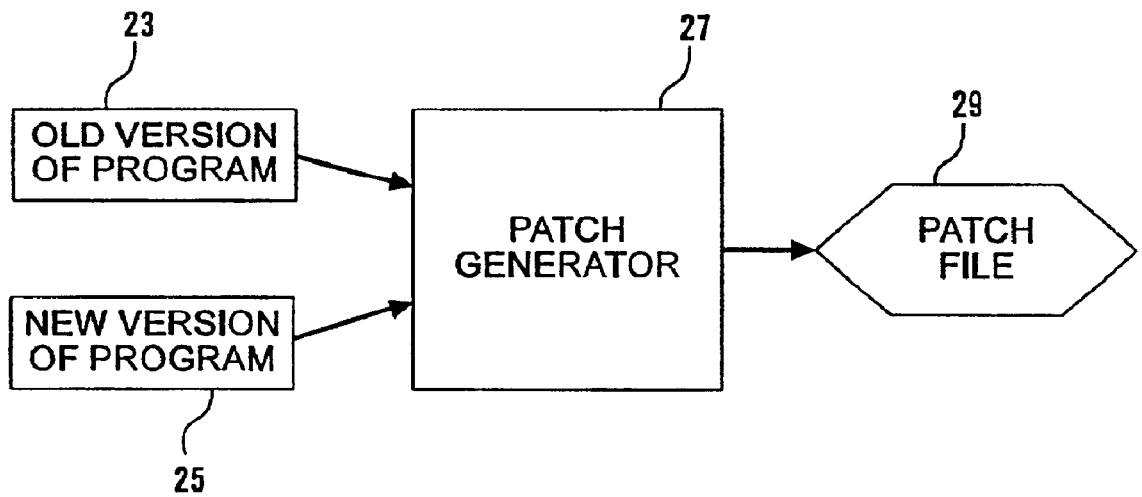
FIG. 2 is a schematic diagram illustrating a prior art process of creating a patch file.

The general process of creating a patch file, in the broadest sense, is well known, and is shown in FIG. 2. An old version 23 of a computer program (FIG. 2) and a new version 25 of a computer program are fed to a patch generator 27. The patch generator 27 creates a patch file 29. The patch file 29 may be transmitted over a communications network such as the communications network 21 to a client such as the client 19 (FIG. 1). The client, on which a copy of the old version 23 of a computer program and a patch installer have been loaded, receives the patch file 29. Using the patch file 29, patch installer, and the copy of the old version 23 of a computer program, the client creates a copy of the new version 25 of a computer program.

As more readily seen by reference to FIG. 3, in the present invention the server 17 has a processing unit 32, input and output devices 34, a memory 36 storing an old version 38 of electronic data, a new version 39 of electronic data, and a patch generator 40 which is used to create a patch file (discussed below).

Figure 4:
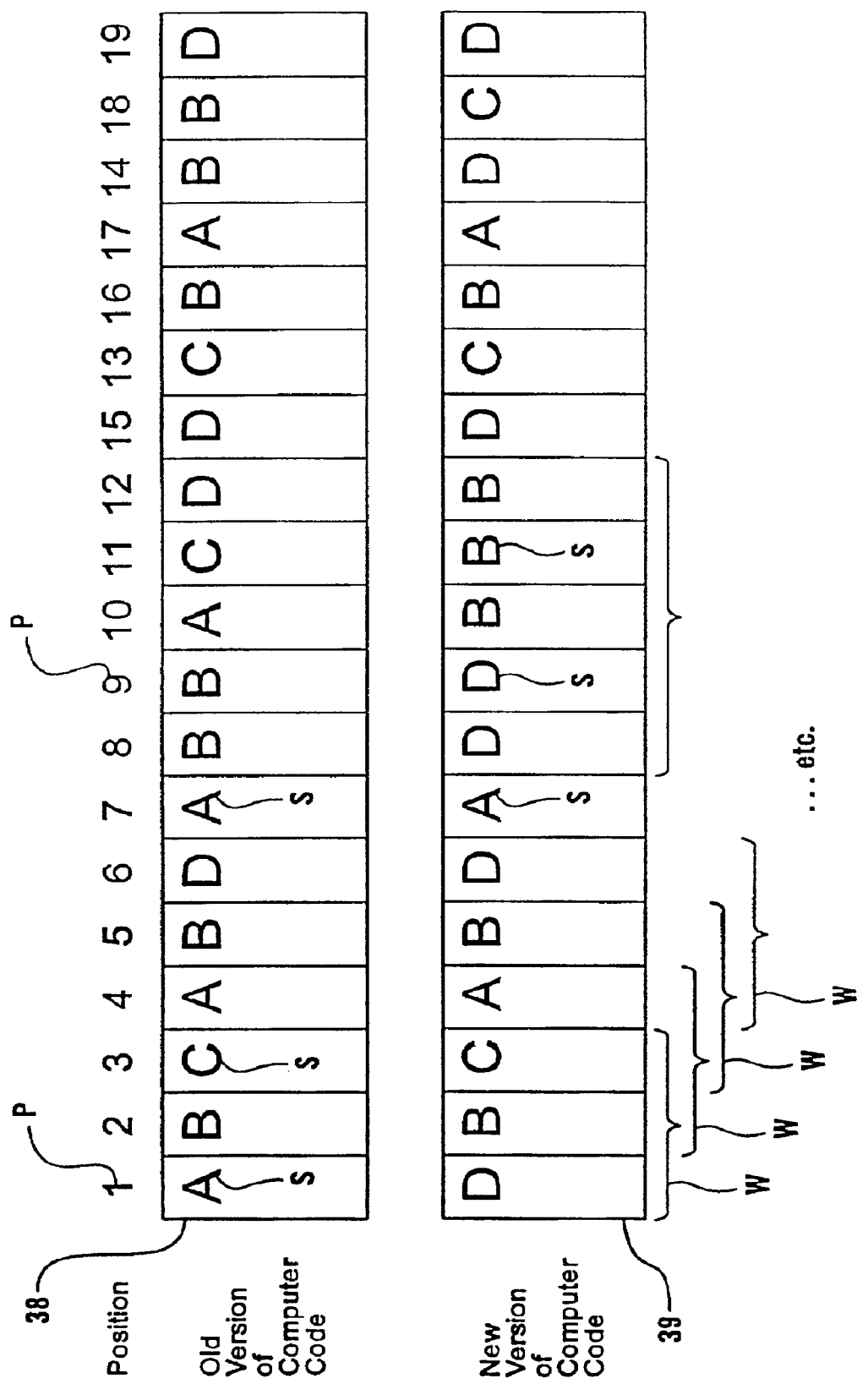
FIG. 4 is a schematic diagram of two exemplary files, an old version of electronic data, and a new version of electronic data.

As best seen by reference to FIG. 4, the old version 38 of electronic data may be illustrated as a series of elements or symbols S (which, for the example shown, are English alphabetic symbols, but in actual files the elements would be bits of information, i.e., "1s and 0s"). Each symbol S has a position P in the electronic data 38 and 39 indicated by the numbers 1–19. In actual files, each position P is an offset (in bytes) based on a single byte (the very left byte in a file is the first position). Using the symbols S, an alphabet is developed where a series of symbols makes up a single word W. For purposes of explanation, three sequential symbols are considered to be a single word, although the number of symbols in a word can be changed. As will be better understood after further explanation below, the choice of word size affects the time it takes to generate a patch file as well as the size of the patch file. Using large words, patch files may be generated very quickly, but the resulting size of such files is relatively large. Using small words, patch files are generated relatively slowly, but are small in size.

It is presently thought that all sequences of 12 bytes following each other in a file should be treated as a single word in order to optimize time and size considerations. However, for purposes of discussion, the invention will be described with three-symbol words. By way of example, with three consecutive elements or symbols as a word, an initial sequence of "ABCDEF" yields four words W, namely: "ABC," "BCD" (not "DEF"), "CDE," and "DEF." The words W are determined using a sliding window of length 3, moving it to the right, one symbol at a time, through the sequence of symbols.

FIG. 4 also illustrates a series of symbols that represent the new version of electronic data. (For the sake of simplicity, the old and new versions 38 and 39 of electronic data are the same length, but usually this is not the case, and it makes no difference whether it is or is not the case.) To create a patch file (discussed below), the patch generator 40 first processes the old and new versions 38 and 39 of electronic data into lists of three-symbol words as shown in FIG. 5; a first list 50 of words and a second list 52 of words. Next, the first list 50 of words (old version 38 of electronic data) is sorted alphabetically. Specifically, the first list 50 is sorted using the server 17 according to the established alphabet to create a first sorted list 55 of data with a pointer or offset $P_{1st}$ (FIG. 5) indicating the original location of each sorted word W in the old version 38 of electronic data. The second list 52 of words (new version 29 of electronic data) is similarly sorted to create a second sorted list 57 of data with a pointer or offset $P_{2nd}$.

As best seen by reference to FIG. 7, once the first and second sorted lists 55 and 57 of data are generated, the patch generator 40 searches through each of the sorted lists recursively, comparing the first and second sorted lists of data one word at a time for a match of data. In particular, if the first word in the first sorted list 55 is less than (alphabetically) the first word in the second sorted list 57, then the next word in the first sorted list is compared to the first word in the second sorted list. However, if the selected word in the first sorted list 55 is greater than the selected word in the second sorted list 57, then the next word in the second sorted list is compared to the selected word in the first sorted list.

If a match or coincidence in the first and second sorted lists 55 and 57 of data is found, the coincidence is stored in a list of coincidences 60 (FIG. 8). Upon finding a coincidence, the patch generator 40 also searches the first and second sorted lists of data to find the largest sequence of coinciding symbols S preceding and succeeding the initial coincidence and this block of coinciding symbols is recorded in the list of coincidences 60. The list of coincidences 60 is then processed to remove duplicative coincidences or, more generally, duplicative information, indicated in the list by asterisks. The removal of duplicative information results in the creation of a refined list of coincidences 65 (FIG. 9). In short, if two equivalent words W are found (i.e., a coincidence) and the symbols preceding the coincidence in the first and second sorted lists of data 55 and 57 are the same, the coincidence is considered to contain duplicative information, and thus not included in the refined list of coincidences 65.

Once the refined list of coincidences 65 is generated, additional information is obtained by sorting the refined list of coincidences 65 by the offset or position in the new version of electronic data of each non-duplicative coincidence, resulting in a sorted list of coincidences 70 (FIG. 10). By adding the position or offset of each coincidence in the new version 39 of electronic data to the maximum coincidence length (measured in the number of elements or symbols S) an end block list 75 (FIG. 11) is obtained which provides a means of calculating the intersections between the elements or symbols of the new version of electronic data 39 and the refined list of coincidences 65.

Figure 3:
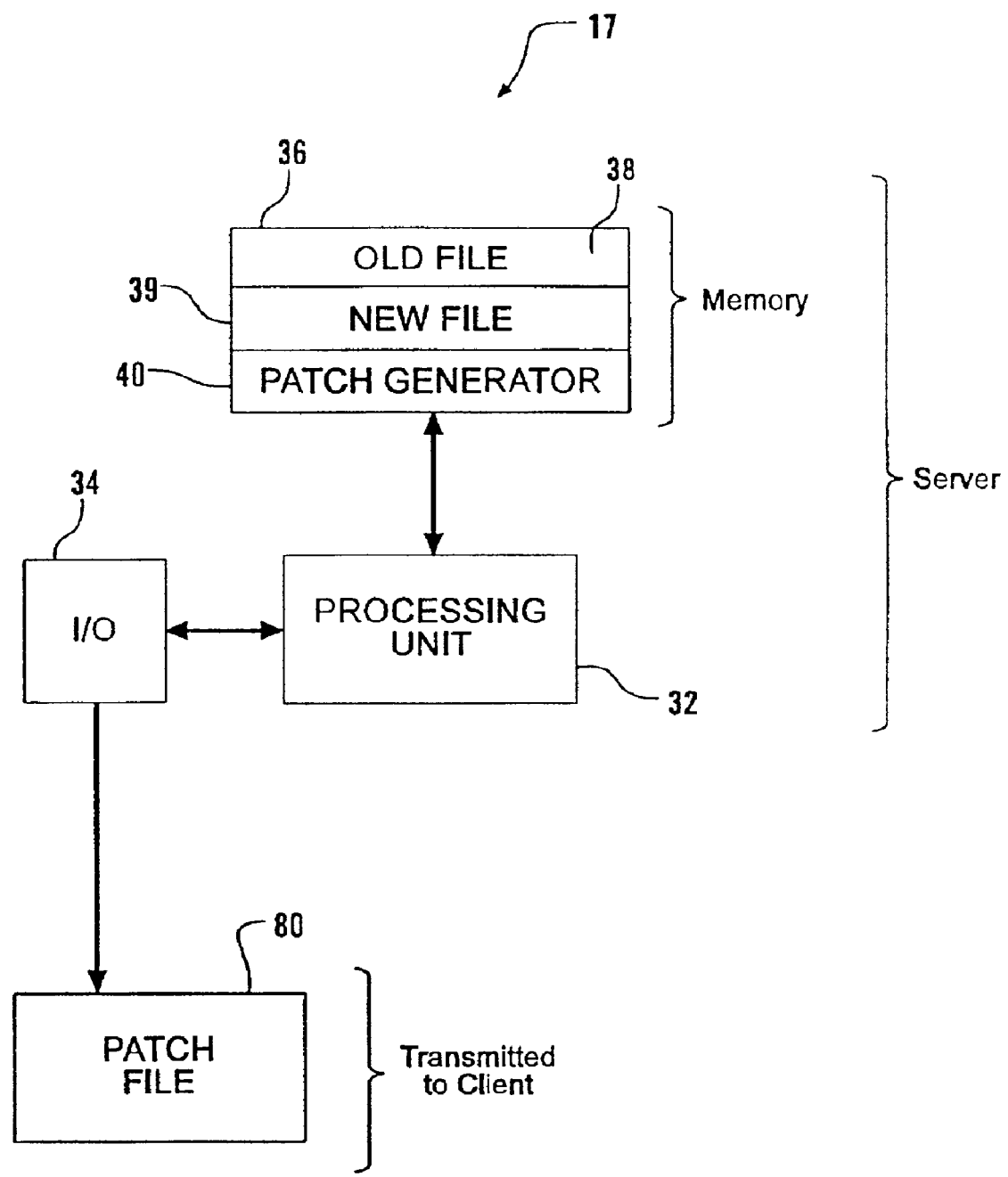
FIG. 3 is a more detailed schematic diagram of the server shown in FIG. 1.

Having generated the sorted list of coincidences 70 and end block list 75, the patch generator 40 can now generate a patch file 80 (FIG. 3). In the present invention the patch file 80 is generated recursively based on the contents of the new version 39 of electronic data. The patch generating algorithm is described below.

The patch generating algorithm may be incorporated into a procedure, which for purposes hereof may be called "BuildPatch." The procedure call BuildPatch (m, n) is made where m and n are parameters representing the starting and the ending offsets in the new version 39 of electronic data, respectively. If m>n, then the BuildPatch procedure terminates. If m<=n, then the procedure searches for the largest coincidence or block of symbols of the maximum length within the segment range (m, n) using the sorted list of coincidences 70. More specifically, the BuildPatch procedure searches for a block of symbols in the new version of electronic data 39 having a starting position i and an ending position j such that m<=i<=j<=n. If such a block of symbols does not exist in the sorted list of coincidences 70, the BuildPatch procedure writes the contents of the (m, n) segment or block of symbols directly into the patch file 80 and subsequently terminates. If such a block is found, the BuildPatch procedure proceeds as follows:

(1) call BuildPatch (m, i−1);

(2) replace the (i, j) block with a corresponding reference to the old version 38 of electronic data. More specifically, the procedure writes a "write from the old file" ("WFOF") command in the patch file 80 which indicates the data from the old version 38 of electronic data to be used, by means of its offset or location and length within the old version. Then, (3) call BuildPatch (j+1, n).

Considering the specific example in FIGS. 4–11, the first step in the process is to call BuildPatch (1, 19). BuildPatch then searches for the block of symbols of maximum length by scanning the sorted list of coincidences 70, which for the exemplary files given herein is the block containing the word BCA with offsets in both the old and new versions 38 and 39 of data from the 2nd to the 7th position P. BuildPatch then calls itself: BuildPatch (1, 1). BuildPatch (1, 1) takes the 1st block and calculates its intersection with the parameters m and n. The length of this intersection is zero (2>1). Of course, there is also a zero length intersection when the (1, 1) block is intersected with the remaining blocks of symbols: (11>1, 13>1). Finally, BuildPatch (1, 1) writes a "write from the patch file" ("WFPF") command along with the (1, 1) block of the new version 39 of electronic data into the patch file 80, since there are no common blocks with the old version 38 of electronic data within the range (1, 1) of the new version. BuildPatch (1, 1) then terminates.

Although the BuildPatch (1, 1) call has terminated, the BuildPatch (1, 19) call has not and continues the operation according to the basic process set out above. Since the (2, 7) block of symbols in the new version 39 of electronic data coincides with the (2, 7) block of symbols from the old version 38 of electronic data, the call results in a WFOF command with the offsets for the (2, 7) block of the old version being written into the patch file 80. Subsequently, BuildPatch (8, 19) is called.

BuildPatch (8, 19) projects the sorted list of coincidences 70 onto the block (8, 19) of the new version 39 of electronic data. This projection yields the following:

| Max Coincidence Block Length | 3(BCD) | 4(DCBA) |
|---|---|---|
| Old File Offset | 17 | 13 |
| New File Offset | 11 | 13 |

The (13, 16) block (which includes the symbols DCB) is the largest block, having a four-symbol length in the (8, 19) block. Following the process noted, the BuildPatch procedure then calls BuildPatch (8, 12). BuildPatch (8, 12) projects the sorted list of coincidences 70 onto the block (8, 12) of the new version 39 of electronic data, which yields the following:

| Max Coincidence Block Length | 2 (not 3!) |
|---|---|
| Old File Offset | 17 |
| New File Offset | 11 |

Bear in mind the projection is limited to the (8, 12) block of the new version 39 and, thus, it is not possible to find the 3 symbol coincidence BBD which exists in the block (8, 13).

Since the last coincidence was found, BuildPatch calls BuildPatch (8, 10). BuildPatch (8, 10) writes the block of symbols (8, 10) into the patch file 80 and returns control of the program to the up-calling procedure, BuildPatch (8, 12).

Figure 12:
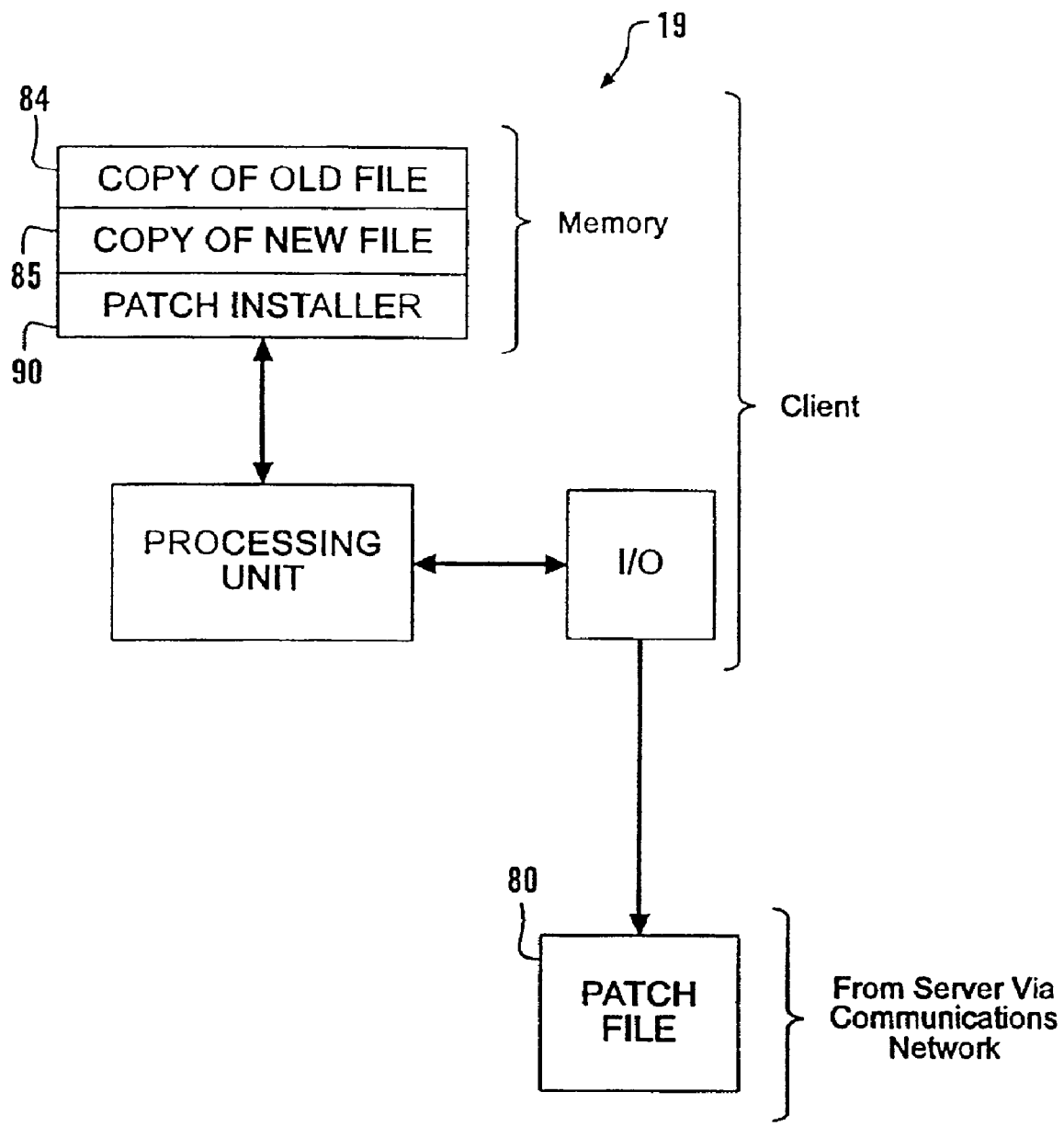
FIG. 12 is a more detailed schematic diagram of the client shown in FIG. 1.

The BuildPatch (8, 12) call results in a WFOF command with the offsets for the (17, 18) block of the old version 38 of electronic data being written into the patch file 80. The symbols in the (17, 18) block will be written into the (11, 12) block of the new copy of the new version 85 of electronic data generated in the client 19 (see FIG. 12). Then, Build-Patch (8, 12) calls BuildPatch (13, 12). BuildPatch (13, 12) does nothing and immediately terminates. BuildPatch (8, 19) then writes a WFOF command into the patch file 80 with directions to write the symbols in the (13, 16) block of the old version 38 of electronic data into the (13, 16) block of the new copy of the new version 85 of electronic data. BuildPatch (8, 19) then calls BuildPatch (17, 19). Build-Patch (17, 19) writes the (17, 19) block of data symbols in the patch file 80 and terminates. Then BuildPatch (8, 19) terminates. Finally, BuildPatch (1, 19) terminates too. Following through the above process, the file structure of the patch file 80 is as follows:

[WFPF "D"; WFOF block (2, 7); WFPF "DDB"; WFOF block (17, 18); WFOF block (13, 16); WFPF "DCD"; end-of-patch command].

The patch file 80 is combined with a copy of the old version 84 of the electronic data on the client 19 (FIG. 12) to create a new copy 85 of the new version 25 of the subject computer program using a patch installer 90. Since the patch file 80 is, in fact, the same as the new version of the computer program, but with all the coincidences replaced with corresponding references to the old version of a computer program, the patch installer 90 is a rather simple program and writing such a program would be within the ability of those skilled in the present art. For purposes of brevity, it is not discussed herein.

Figure 13:
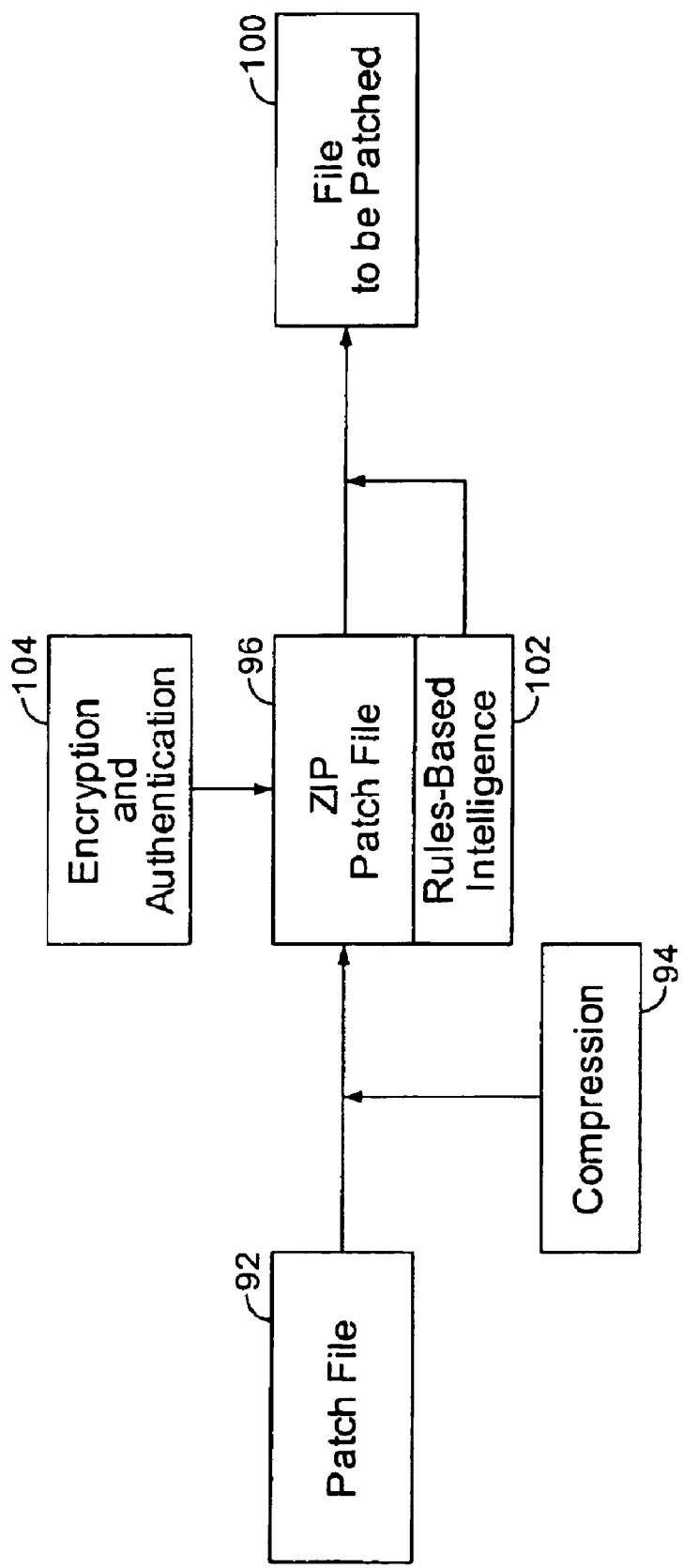
FIG. 13 is a schematic diagram illustrating a process of creating a .ZIP patch file.
Figure 14:
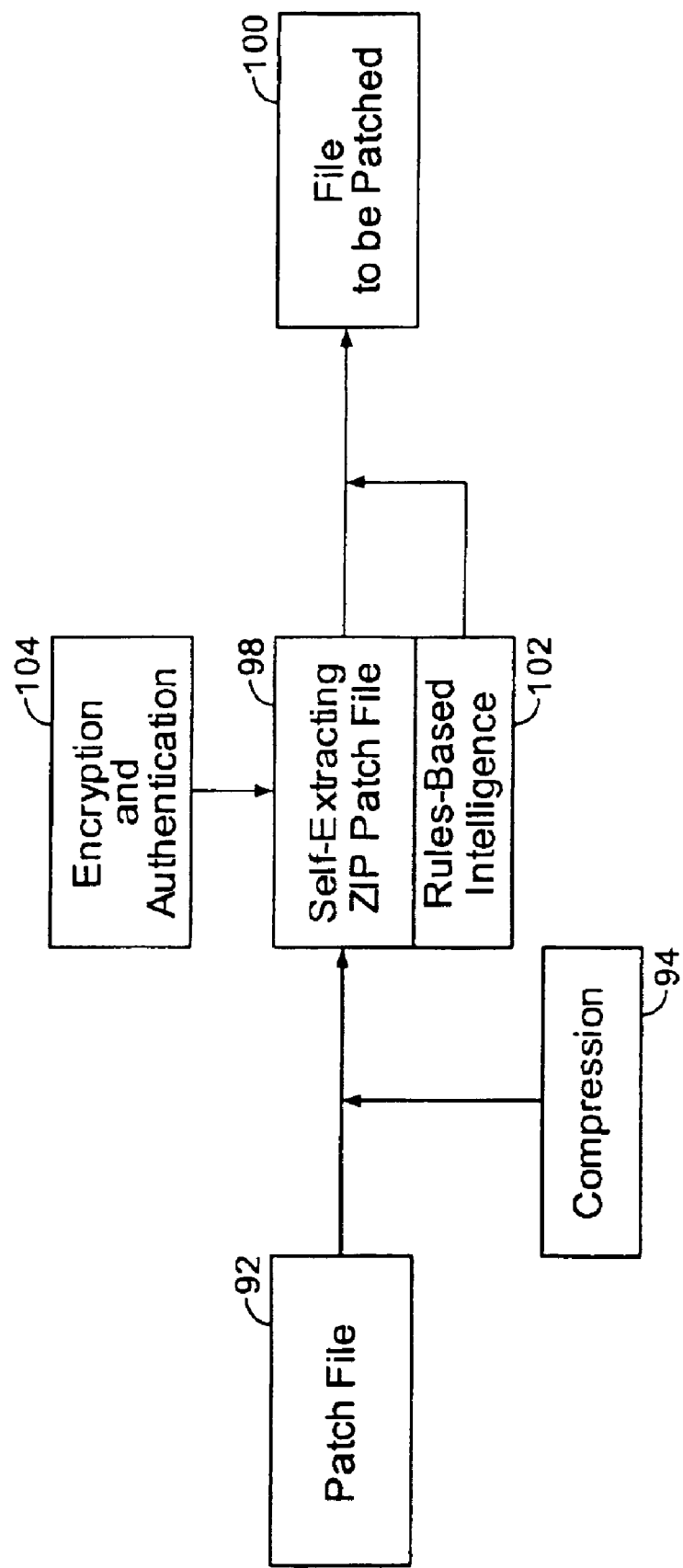
FIG. 14 is a schematic diagram illustrating a process of creating a self-extracting .ZIP patch file.

As shown in FIGS. 13 and 14, the present invention provides an improved method and system for creating a patch file. The resulting patch file 92 may be compressed using a compression program 94 into a .ZIP patch file 96 using PKZIP® or a self-extracting .ZIP patch file 98 using PKSFX® to yield a deliverable of a portable compressed patch file that allows for combining multiple patch files into a portable archive used to transfer the collection of patches more efficiently using compression, authentication and encryption. The one or more patch files created will be aggregated into a secure, portable, compressed archive for distribution to files to be patched 100. This portable archive of files 96, 98 also includes features to detect the presence of files to be patched on the target system and then applies the sequence of patches automatically using rules based intelligence 102. This archive may be in the format of a .ZIP file or a self-extracting .ZIP file, depending upon the compression algorithm used. The archive will hold the patch files in a compressed form to decrease the storage and transfer requirements of the patch data. The .ZIP and self-extracting .ZIP patch files archive may also include functionality for encryption and authentication 104 of the files and/or archive using digital signatures to secure the contents from unauthorized access and to validate the identity of the creator of the archive.

As mentioned above, the .ZIP patch file 96 and the self-extracting .ZIP patch file 98 may include a rules-based form of intelligence 102 to detect the presence of the appropriate files to be patched and to determine how the patching process should proceed.

Also as mentioned above, the present invention provides the capability of compressing 94 the patch files 92 into .ZIP patch files 96 or self-extracting .ZIP patch files 98 including encryption and authentication 104 using digital signatures for combining, compressing, signing, and transporting the patch data. The present invention also allows a user to digitally sign and encrypt individual patch files archived in a .ZIP file or a self-extracting .ZIP file, and subsequently to authenticate and decrypt those files upon extraction. Signing a .ZIP patch file allows a user to detect whether a .ZIP patch file's integrity has been compromised. Encrypting a file denies access to the file's contents by unauthorized users. Before a user can sign or encrypt files, the user must first have a digital certificate with which to sign or encrypt. A digital certificate may be obtained from VeriSign, Thawte or another certificate authority.

While the invention has been described with reference to preferred embodiments, it is to be understood that the invention is not confined to those embodiments or the particular examples and arrangement of the components herein illustrated and described, but embraces such modified forms thereof as come within the scope of the appended claims. In other words, those skilled in the art will appreciate that certain substitutions, alterations and omissions may be made without departing from the spirit of the invention. Accordingly, the foregoing description is meant to be exemplary only, and should not limit the scope of the invention set forth in the following claims.

What is claimed is:

1. A method of generating a patch file from an old version of data consisting of a series of elements and a new version of data consisting of a series of elements where both the old and new versions of data are stored in a memory and accessible by a data processor, the method comprising the steps of:

establishing an alphabet comprising a plurality of letters for processing the old and new versions of data wherein a word consists of a series of elements represented by one or more letters of the alphabet;

sorting the old version of data with the data processor alphabetically according to the established alphabet to create a first sorted list of words and maintaining a pointer for each element of the first sorted list of words indicating the element's original location in the old version of data;

sorting the new version of data with the data processor alphabetically according to the established alphabet to create a second sorted list of words and maintaining a pointer for each element of the second sorted list of words indicating the element's original location in the new version of data;

recursively comparing the first and second sorted lists of words one word at a time for a match of the words;

upon finding a match of the words, searching the first and second sorted lists of words again to find the largest sequence of coinciding elements preceding and succeeding the match of words;

storing the largest sequence of coinciding elements in a coincidences list;

processing the coincidences list to remove duplicative coincidences, creating a refined list of coincidences;

sorting the refined list of coincidences by pointer in the new version data, creating a sorted list of coincidences;

adding the pointer of each coincidence in the new version data to the largest sequence of coinciding elements, creating an end block list;

creating a patch file from the sorted coincidences list and the end block list; and compressing the patch file into a secure, portable compressed archive for distribution.

2. The method of claim 1 wherein the patch file includes a series of write commands.

3. The method of claim 2 wherein creating a patch file from the sorted coincidences list and end block list includes the steps of:
(a) finding a largest block of coinciding elements of the sorted coincidences list that matches the second sorted list of words and recording the location of the largest found block;
(b) in the area before the previously found block, finding the next largest block of coinciding elements of the sorted coincidences list that matches the second sorted list of words and recording the location of the next largest found block;
(c) repeating step (b) until
(i) the first member in the sorted list of coincidences is reached; or
(ii) there are no matches between the second sorted list of words and the sorted coincidences list;
(d) writing a write from the old version of data command and pointer and length information to the patch file if the first member of the sorted list of coincidences is reached; and
(e) writing a write from patch file command and length and patch information to the patch file when there is no match between the second sorted list of data and the sorted coincidences list.

4. The method of claim 1 wherein one or more patch files are compressed into the .ZIP file format to decrease the storage and transfer requirements of the patch files.

5. The method of claim 1 wherein the .ZIP file further includes encryption and authentication using digital signatures to secure the contents of the patch files from unauthorized access and to validate the identity of the creator of the archive.

6. The method of claim 1 wherein the .ZIP file is in the format of a self-extracting .ZIP file.

7. The method of claim 6 wherein the self-extracting .ZIP file includes a rules-based form of intelligence to detect the presence of the appropriate files to be patched and to determine how the patching process should proceed.

8. A system for generating a patch file from an old version of data consisting of a series of elements and a new version of data consisting of a series of elements, the system comprising:
a data processor;
a memory storing the old and new versions of data;
means for sorting the old version of data with the data processor alphabetically according to an established alphabet to create a first sorted list of data and for maintaining a pointer for each element of the first sorted list of data indicating the element's original location in the old version of data;
means for sorting the new version of data with the data processor alphabetically according to an established alphabet to create a second sorted list of data and for maintaining a pointer for each element of the second sorted list of data indicating the element's original location in the new version of data;
means for searching the first and second sorted lists of data to find a match of data;
means for storing the match of data as a sequence of coinciding elements in a coincidences list;
upon finding a match of data, means for searching the first and second sorted lists of data again to find the largest sequence of coinciding elements preceding and succeeding the match of data;
means for storing the largest sequence of coinciding elements in the coincidences list;
means for processing the coincidences list to remove duplicative coincidences, creating a refined list of coincidences;
means for sorting the refined list of coincidences by pointer in the new version of data, creating a sorted list of coincidences;
means for adding the pointer of each coincidence in the new version of data to the largest sequence of coinciding elements, creating an end block list;
means for creating a patch file from the sorted coincidences list and end block list; and
means for compressing the patch file into a secure, portable compressed archive for distribution.

9. The system of claim 8 wherein the means for creating a patch file includes:
means for finding the largest block of coinciding elements of the sorted coincidences list that matches the second sorted list of data and recording the location of the largest found block of coinciding elements in a memory;
means for finding the next largest block of coinciding elements of the sorted coincidences list that matches the second sorted list of data and recording the location of the next largest block of coinciding elements in the memory;
means for writing a write from the old version of data command and pointer and length information to the patch file; and
means for writing a write from patch file command and length and patch information to the patch file.

10. The system of claim 8 wherein one or more patch files are compressed into the .ZIP file format to decrease the storage and transfer requirements of the patch files.

11. The system of claim 8 wherein the .ZIP file further includes encryption and authentication using digital signatures to secure the contents of the patch files from unauthorized access and to validate the identity of the creator of the archive.

12. The system of claim 8 wherein the .ZIP file is in the format of a self-extracting .ZIP file.

13. The system of claim 12 wherein the self-extracting .ZIP file includes a rules-based form of intelligence to detect the presence of the appropriate files to be patched and to determine how the patching process should proceed.

* * * * *